(12) United States Patent
Mizuno

(10) Patent No.: US 6,398,560 B1
(45) Date of Patent: Jun. 4, 2002

(54) LCD-DEVICE RETAINING STRUCTURE OF PORTABLE ELECTRONIC EQUIPMENT

(75) Inventor: Hiromichi Mizuno, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/470,397

(22) Filed: Dec. 22, 1999

(30) Foreign Application Priority Data

Dec. 25, 1998 (JP) ............................................ 10-371453

(51) Int. Cl.⁷ .............................................. H01R 12/00
(52) U.S. Cl. ......................................... 439/67; 439/496
(58) Field of Search .......................... 439/67, 493, 496, 439/34, 77, 83

(56) References Cited

U.S. PATENT DOCUMENTS

| | | | |
|---|---|---|---|
| 4,691,972 A | * 9/1987 | Gordon | 439/77 |
| 5,040,997 A | * 8/1991 | Garner | 439/77 |
| 5,433,632 A | * 7/1995 | Cherney et al. | 439/495 |
| 5,442,470 A | * 8/1995 | Hashimoto | 359/83 |
| 6,000,949 A | * 12/1999 | Takiguchi et al. | 439/34 |

FOREIGN PATENT DOCUMENTS

| JP | 3-81984 | 8/1991 |
|---|---|---|
| JP | 3-105880 | 11/1991 |
| JP | 6-258623 | 9/1994 |

\* cited by examiner

Primary Examiner—Brian Sircus
Assistant Examiner—Son V. Nguyen
(74) Attorney, Agent, or Firm—Scully, Scott Murphy & Presser

(57) ABSTRACT

A LCD-device retaining structure of portable electronic equipment is provided, which suppresses any damage of the LCD device such as cracks even if the equipment is subjected to external shock or forces. This structure comprises (a) a first flexible circuit board having a driver IC for driving an LCD device, first terminals electrically connected to the IC, and second terminals electrically connected to the IC; the first terminals being mechanically and electrically connected to the LCD device; the first circuit board having penetrating holes; (b) a second circuit board having specific circuits mechanically and electrically connected to the second terminals of the first circuit board; and (c) a frame member having a lower frame part and bosses extending downward; the LCD device being fixed on an upper face of the frame member; the lower frame part being contacted with the second circuit board to form a space between the member and the second circuit board, thereby fixing the member to the second circuit board and covering the second terminals of the first circuit board in the space; the lower frame part having a window for allowing the first circuit board to enter the space through the lower frame part; the bosses being located near the window and penetrating the holes of the first circuit board to be contacted with the second circuit board in the space.

5 Claims, 12 Drawing Sheets

LCD-DEVICE RETAINING STRUCTURE OF PORTABLE ELECTRONIC EQUIPMENT

BACKGROUND OF THE INVENTION

1. Field of the Invention

The present invention relates to a structure of retaining a Liquid Crystal Display (LCD) device of portable electronic equipment and more particularly, to a retaining structure of an LCD device of portable electronic equipment such as cellular phones, pagers, and so on, which prevents an external mechanical stress from applying to the LCD device.

2. Description of the Prior Art

In recent years, there has been the surging need for portable electronic equipment such as mobile communications apparatuses. In particular, car phones, cellular phones, and pagers, which are intended to utilize the public communications service, have been extensively used by not only enterprises but also individuals.

The mobile communications apparatuses of this sort have been usually used for transmission and reception of voice or audio signals and reception of numerical information. However, more recently, they have been often used for reception of character data for the purpose of using various existing information services and of transmitting and receiving electronic mail (E-mail). Accordingly, to increase the displayable number of characters on the screen of a LCD assembly or device, the display area or screen size of the LCD device tends to become larger and larger.

On the other hand, there has been the successive need for making these portable electronic equipment more lightweight and more compact. Thus, recently, the dimensional ratio of the LCD device to the apparatus itself has been increasing more and more.

Usually, a semiconductor Integrated Circuit (IC) is electrically connected to the LCD device for driving this device and for controlling the display operation of the same. The driver IC is typically incorporated into a Tape Carrier Package (TCP). The TCP comprises a flexible tape, on which specific wiring lines and terminals connected to these lines are formed. The driver IC is mounted on the tape so as to be electrically connected to the wiring lines using bonding wires or the like, and is typically encapsulated by a plastic material. It is typical that the driver IC packaged in the form of the TCP is electrically and mechanically connected to the LCD device by a thermally-compressing bonding method using a so-called heat seal or an Anisotropic Conductive Film (ACF).

Moreover, to prevent the LCD device from being damaged or broken due to some mechanical stress caused by shock or some bending or twisting force applied to the case of the apparatus, the LCD device is positioned at a specific location in the communication apparatus by using a frame member. The frame member has an upper frame part surrounding the periphery of the LCD device, thereby forming a space for the LCD device. The LCD device is fitted into the space and as a result, it can be correctly positioned at the desired location. The frame member to which the LCD device is attached is typically mounted on a specific Printed Wring Board (PWB) having specific circuits required for communication.

When the LCD device and the TCP are mounted on the PWB, for the purpose of compactness, the TCP is bent at a specific position so as to be folded in two, thereby arranging them so that the LCD device is overlapped with the underlying driver IC mounted on the TCP. Thus, the LCD device is located on the frame member and at the same time, the driver IC is located on the PWB below the frame member. Because of this configuration, the frame member needs to have a U-shaped lower frame part to form a space between the frame member and the FWB for receiving the driver IC. Furthermore, the U-shaped lower frame part needs to have an opening for allowing the TCP connected to the LCD device to enter the space for the IC.

FIGS. 1 to 3 show a prior-art frame member used for mounting the LCD device on the PWB in a pager.

As shown in FIGS. 1 to 3, a frame member 140 has a rectangular-plate-shaped main part 144, an upper frame part 141 formed on the upper periphery of the part 144, a lower frame part 142 formed on the lower periphery of the part 144, and four engaging pins 143 extending downward from the lower frame part 142.

The main part 144 is used for supporting the LCD device and the upper frame part 141 is used for positioning the same thereon. In other words, the LCD device is located on the upper flat surface 144e of the main part 144, and is fitted into an upper space S101 formed by the main part 144 and the upper frame part 141.

The upper frame part 141 has four walls 141a, 141b, 141c, and 141d located respectively on the four upper edges of the main part 144 and perpendicular to the same. The left, rear, and right walls 144b, 144c, and 144d cover entirely the corresponding edges of the main part 141, respectively. However, the front wall 144a has a rectangular opening or window 141e at its middle position, covering only the left and right sides of the edge of the main part 144. Thus, it may be said that the upper frame part 141 has an approximately U-shape. The opening or window 141e is provided for allowing the TCP to enter the space S101 through the front wall 141a.

Similar to the upper frame part 141, the lower frame part 142 has four walls 142a, 142b, 142c, and 142d located respectively on the four lower edges of the main part 144 and perpendicular to the same. The left, rear, and right walls 142b, 142c, and 142d cover entirely the corresponding edges of the main part 144, respectively. However, the front wall 142a has a rectangular opening or window 142e at its middle position, covering only the left and right sides of the edge of the main part 144. The opening or window 142e is provided for allowing the TCP to enter a lower space S102 formed by the main part 144 and the lower frame part 142 through the front wall 142a, where the space S102 is used for receiving the driver IC mounted on the TCP.

The four engaging pins 143 are used for fixing the frame member 140 onto a specific PWB. The pins 143 are inserted into corresponding openings of the PWB and engaged therewith, thereby fixing the frame member 149 to the PWB.

The frame member 140 is typically made of a plastic or metal.

On the other hand, the LCD device is comprised of two glass plates fixed to be parallel to each other and a liquid crystal material confined in the intervening space between these two plates. Transparent electrodes, which are made of indium tin oxide (ITO), are formed on the inner surface of each of the plates. To electrically connect the electrodes to the TCP, part of the electrodes are exposed from the space.

With the prior-art frame member 140, the following problem occurs. Specifically, the flat main part 144 cannot be directly contacted with the PWB because the lower space S102 needs to be formed by the lower frame part 142. At the same time as this, the whole periphery of the lower frame part 142 is unable to be supported by the PWB due to existence of the window 142e. Accordingly, the mechanical strength of the frame member 140 is insufficient in the vicinity of the window 142e, resulting in a problem that some flexure or deflection tends to be generated in the frame member 140 in the vicinity of the window 142e.

The flexure or deflection thus generated in the frame member 140 will affect badly the LCD device mounted on the member 140, thereby causing mechanical stress concentration in the LCD device near the window 142e. Because of the above-described configuration of the LCD device along with the mechanical stress concentration, cracks tend to be formed in the LCD device, making the user difficult or unable to see the displayed information on the screen or damaging the LCD device itself.

SUMMARY OF THE INVENTION

Accordingly, an object of the present invention is to provide a LCD-device retaining structure of portable electronic equipment that increases the mechanical strength of a frame member for supporting an LCD device with a simple measure.

Another object of the present invention is to provide a LCD-device retaining structure of portable electronic equipment that suppresses any damage of the LCD device such as cracks even if the equipment is subjected to external shock or forces.

Still another object of the present invention is to provide a LCD-device retaining structure of portable electronic equipment that suppresses any breakage and failure of the external terminals of the TCP even if the equipment is subjected to external shock or forces.

The above objects together with others not specifically mentioned will become clear to those skilled in the art from the following description.

A LCD-device retaining structure of portable electronic equipment according to a first aspect of the present invention comprises:
(a) an LCD device;
(b) a first circuit board having a driver IC for driving the LCD device, a first set of terminals electrically connected to the driver IC, and a second set of terminals electrically connected to the driver IC;
   the first circuit board being flexible so as to be bent at a flexible position;
   the first set of terminals being located near one end of the first circuit board and mechanically and electrically connected to the LCD device;
   the second set of terminals being located near the other end of the first circuit board;
   the first circuit board having penetrating holes;
(c) a second circuit board having specific circuits for the electronic equipment;
   the circuits of the second circuit board being mechanically and electrically connected to the second set of terminals of the first circuit board; and
(d) a frame member having a lower frame part and bosses extending downward;
   the LCD device being fixed on an upper face of the frame member;
   the lower frame part being contacted with the second circuit board to form a space between the frame member and the second circuit board, thereby fixing the frame member to the second circuit board and covering the second set of terminals of the first circuit board in the space;
   the lower frame part having a window for allowing the first circuit board to enter the space through the lower frame part;
   the bosses being located near the window of the lower frame part and penetrating the holes of the first circuit board to be contacted with the second circuit board in the space.

With the LCD-device retaining structure according to the first aspect of the present invention, the frame member has the bosses located near the window of the lower frame part, and the bosses penetrate the holes of the first circuit board to be contacted with the second circuit board in the space formed between the frame member and the second circuit board. Accordingly, the mechanical strength of the frame member can be increased with a simple measure. Thus, any damage of the LCD device such as cracks and any breakage and failure of the first terminals of the first circuit board such as a TCP can be suppressed even if the portable equipment is subjected to external shock or forces. This means that any breakage and failure of the external terminals of the TCP can be suppressed even if the equipment is subjected to external shock or forces.

In a preferred embodiment of the structure according to the first aspect, the frame member has an upper frame part formed to surround the LCD device. The upper frame part has a window for allowing the first circuit board to penetrate the upper frame part. The windows of the upper and lower frame parts are located near one side of the frame member. The bosses are arranged along the side of the frame member. In this embodiment, the advantages of the invention is conspicuously exhibited.

In another preferred embodiment of the structure according to the first aspect, the frame member has an opening penetrating the same. The bosses of the frame member are arranged near the window of the lower frame part and the opening. In this embodiment, there is an additional advantage that the weight of the frame member can be decreased without lowering its mechanical strength.

A LCD-device retaining structure of portable electronic equipment according to a second aspect of the present invention comprises:
(a) an LCD device;
(b) a first circuit board having a driver IC for driving the LCD device, a first set of terminals electrically connected to the driver IC, and a second set of terminals electrically connected to the driver IC;
   the first circuit board being flexible so as to be bent at a flexible position:
   the first set of terminals being located near one end of the first circuit board and mechanically and electrically connected to the LCD device;
   the second set of terminals being located near the other end of the first circuit board;
   the first circuit board having penetrating holes;
(c) a second circuit board having specific circuits for the electronic equipment;
   the circuits of the second circuit board being mechanically and electrically connected to the second set of terminals of the first circuit board; and
(d) a frame member having a lower frame part surrounding the entire periphery of the member;
   the LCD device being fixed on an upper face of the frame member;
   the lower frame part being contacted with the second circuit board to form a closed space between the frame member and the second circuit board, thereby fixing the frame member to the second circuit board and covering the second set of terminals of the first circuit board in the space;

the lower frame part having a window for allowing the first circuit board to enter the space through the lower frame part;

the frame member being supported by the whole lower frame part.

With the LCD-device retaining structure according to the second aspect of the present invention, the frame member has the lower frame part surrounding the entire periphery of the member and is supported by the second circuit board at its whole periphery. Therefore, even if the bosses described in the structure according to the first aspect are not provided, the same advantages as those in the first aspect can be obtained.

In a preferred embodiment of the structure according to the second aspect, the frame member has an upper frame part formed to surround the LCD device. The upper frame part has a window for allowing the first circuit board to penetrate the upper frame part. The windows of the upper and lower frame parts are located near one side of the frame member. In this embodiment, the advantages of the invention is conspicuously exhibited.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
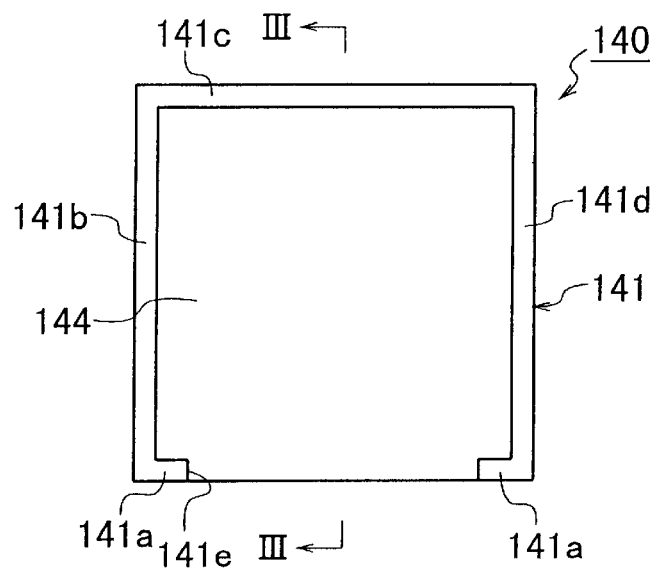
FIG. 1 is a plan view of a prior-art frame member used for mounting the LCD device on a PWB of a pager.
Figure 2:
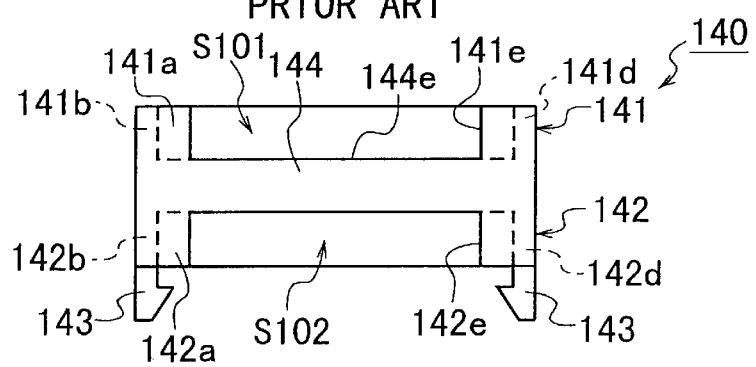
FIG. 2 is a front view of the prior-art frame member of FIG. 1.
Figure 3:
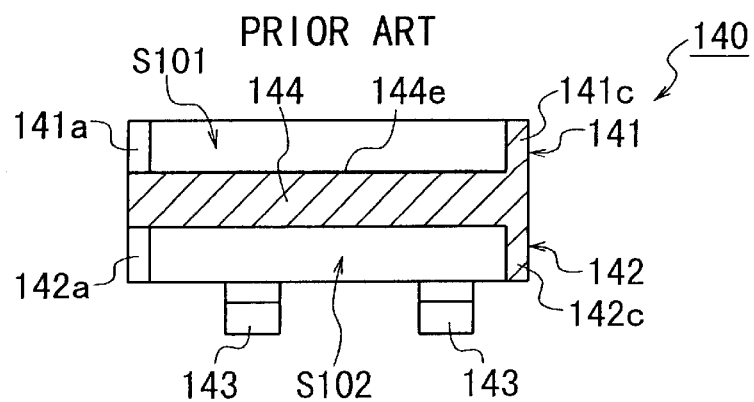
FIG. 3 is a cross-sectional view along the line III—III in FIG. 1.

Preferred embodiments of the present invention will be described in detail below while referring to the drawings attached.

First Embodiment

Figure 4:
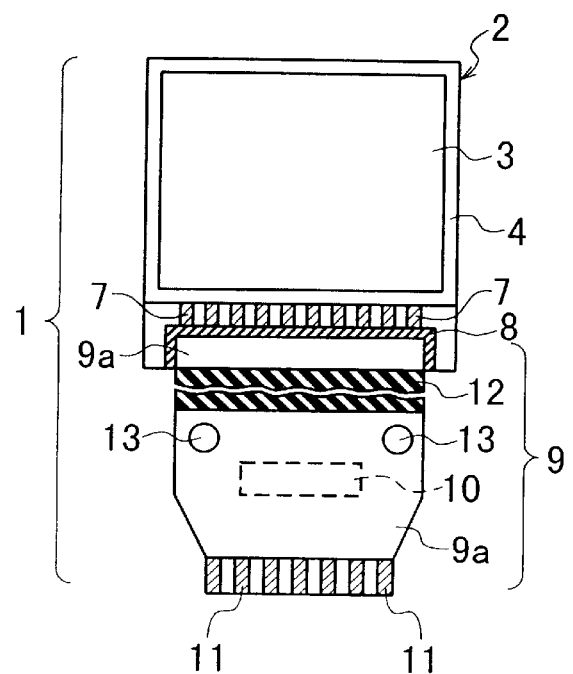
FIG. 4 is a plan view of an LCD module of a pager, which is used for a LCD device retaining structure according to a first embodiment of the present invention.
Figure 5:
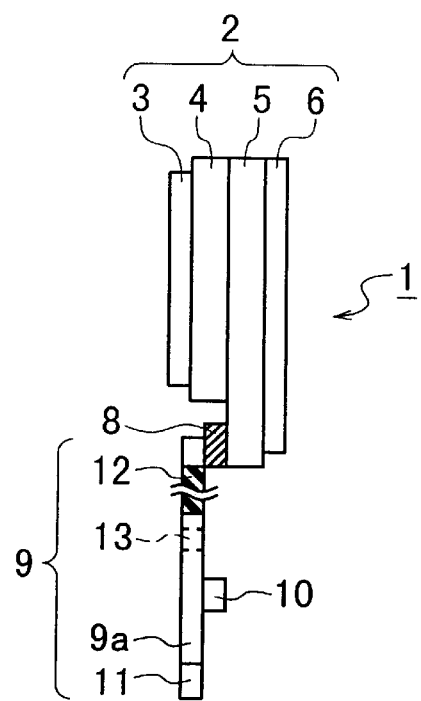
FIG. 5 is a right-side view of the LCD module of FIG. 4.

FIGS. 4 and 5 show the configuration of an LCD module of a pager including a LCD device retaining structure according to a first embodiment.

As shown in FIGS. 4 and 5, an LCD module 1 of a pager is comprised of an LCD device 2 and a TCP 9. The LCD device 2 includes a front polarizing plate 3, a front glass plate 4, a rear glass plate 5, and a rear polarizing plate 6, which are arranged in a stacking manner to form a space therein. A suitable liquid crystal material is contained in the space. The device 2 further has a set of electrodes 7 formed on the rear glass plate 5, which are used for electrically connecting the LCD device 2 to external circuits.

The TCP 9 comprises a plastic tape 9a, a driver IC 10 mounted on the tape 9a, and a set of external terminals 11 formed at the end of the tape 9a. The tape 9a has a flexible or bending part 12 and two circular, penetrating holes 13. The tape 9a can be bent or folded in two at the flexible part 12. The flexible part 12 is typically formed by only wiring cables without the tape 9a, where the cables are coated and coupled together by a polyimide resin. The opposite end of the tape 9a to the terminals 11 is mechanically and electrically connected to the set of electrodes 7 of the LCD device 2 with an ACF 8. Thus, the driver IC 10 mounted on the TCP 9 is electrically connected to the LCD device 2. The holes 13 are used for penetrating bosses of a frame member described below.

Figure 6:
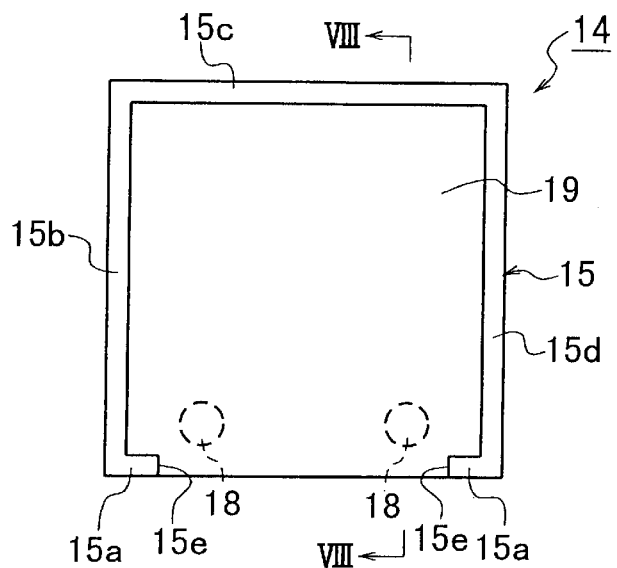
FIG. 6 is a plan view of a frame member used for the LCD device retaining structure according to the first embodiment.
Figure 7:
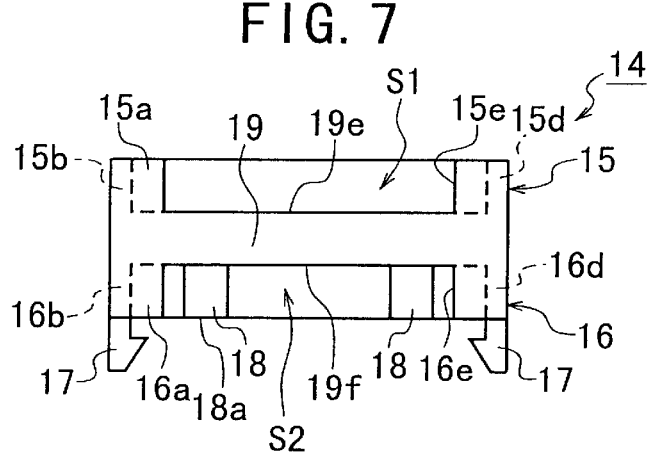
FIG. 7 is a front view of the frame member of FIG. 6.
Figure 8:
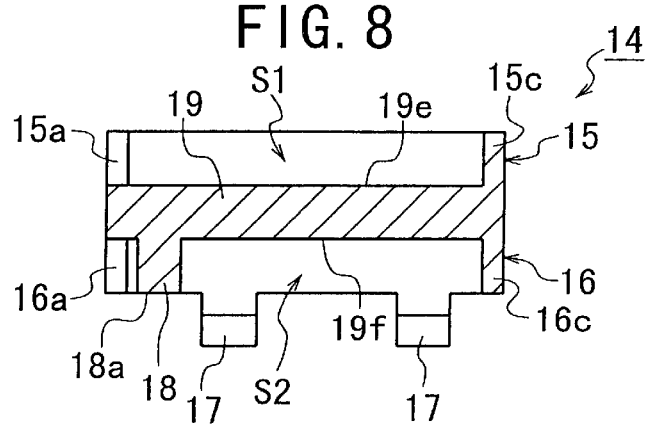
FIG. 8 is a cross-sectional view along the line VIII—VIII in FIG. 6.

FIGS. 6, 7, and 8 show a frame member 14 used for the LCD device retaining structure according to the first embodiment. The frame member 14 has a rectangular-plate-shaped main part 19, an upper frame part 15 formed on the upper periphery of the part 19, a lower frame part 16 formed on the lower periphery of the part 19, four engaging pins 17 extending downward from the lower frame part 16, and two bosses 18 extending downward from the lower flat surface 19f of the main part 19. The pins 17 protrude downward from the bottom end of the lower frame part 16. The bosses 18 do not protrude downward from the bottom end of the lower frame part 16. The bosses 18 have an equal height to that of the lower frame part 16 from the lower surface 19f of the main part 19.

The main part 19 is used for supporting the LCD device 2 while the upper frame part 15 is used for positioning the same thereon. In other words, the device 2 is located on the upper flat surface 19e of the main part 19 and is fitted into an upper space SI formed on the flat surface 19e by the upper frame part 15.

The upper frame part 15 has four walls 15a, 15b, 15c, and 15d located respectively on the four upper edges of the rectangular main part 19 and perpendicular to the same. The left, rear, and right walls 15b, 15c, and 15d cover entirely the corresponding upper edges of the main part 19, respectively. However, the front wall 15a has a rectangular opening 15e at its middle position, covering only the left and right sides of the front lower edge of the main part 19. Thus, almost all the front lower edge of the main part 19 is exposed from the front wall 15e. The opening 15e is provided for allowing the TCP 9 of the LCD module 1 to enter the upper space S1 through the front wall 15a.

Similar to the upper frame part 15, the lower frame part 16 has four walls 16a, 16b, 16c, and 16d located respectively on the four lower edges of the rectangular main part 19 and perpendicular to the same. The left, rear, and right walls 16b, 16c, and 156 cover entirely the corresponding lower edges of the main part 19, respectively. However, the front wall 16a has an opening 16e at its middle position, covering only the left and right sides of the front lower edge of the main part 19. The opening 16e is provided for allowing the TCP 9 of the LCD module 1 to enter a lower space S2 through the front wall 16a, where the lower space S2 is formed on the lower flat surface 19f by the lower frame part 16.

The four engaging pins 17 are used for fixing the frame member 14 onto a PWB 26 termed an "Audio Frequency (AF) board" on which circuits dealing with the AF signals are formed. These pins 17 penetrate corresponding holes 20 of the board 26 and engaged with the same, thereby fixing the frame member 14 onto the board 26. Corresponding to the shape and size of the pins 17, each of the holes 20 has a rectangular shape and a slightly larger size than that of the pins 17.

The two bosses 18 are used for supporting the front edge of the main part 19 of the frame member 14 when the member 14 is mounted on the AF board 26. The bosses 18 penetrate the corresponding holes 13 of the TCP 9 to be contacted with the upper surface of the board 26. Because of the holes 13, there is no the danger that the wiring lines formed in the TCP 9 are broken by the pressing force. The holes 13 produces an additional advantage that the TCP 9 is fixed to the specific position.

Here, the bosses 18 are cylindrical. However, they may have any other shape.

The frame member 14 is preferably made of a plastic such as ABS or metal, because of its easiness in forming or shaping or mechanical processing.

Figure 9:
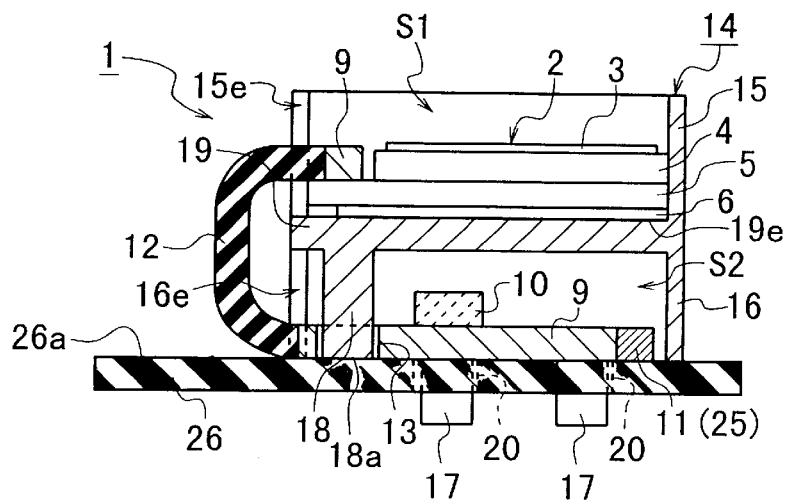
FIG. 9 is a partial, cross-sectional view of the LCD module of FIG. 4 mounted on the PWB using the frame member of FIGS. 6 to 8, which includes the LCD device retaining structure according to the first embodiment.

FIG. 9 shows the state of the LCD module 1 and the frame member 14 which are fixed onto the AF board 26, in which the LCD device retaining structure according to the first embodiment is clearly shown.

As shown in FIG. 9, the lower ends of the lower walls 16a, 16b, 16c, and 16d of the lower frame part 16 are contacted with the upper surface of the AF board 26. The engaging pins 17, which penetrate through the holes 20 of the board 26, are engaged with the lower surface of the board 26. The LCD device 2 is entirely located in the upper space S1 of the member 14 while the upper part of the TCP 9 protrudes from the space S1 toward the front end of the board 26 through the rectangular upper opening 15e of the member 14. The device 2 is fixed onto the upper surface 19e of the member 14 with a double-coated tape 31 (see FIGS. 11 and 12). The bending or flexible part 12 of the TCP 9 is bent downward to enter the lower space S2 of the member 14 through its rectangular lower window 16e. The lower part of the TCP 9 including the driver IC 10 is located in the lower space S2. Thus, the LCD device 2. located in the upper space SI is approximately overlapped with the lower part of the TCP 9 located in the lower space S2.

Figure 10:
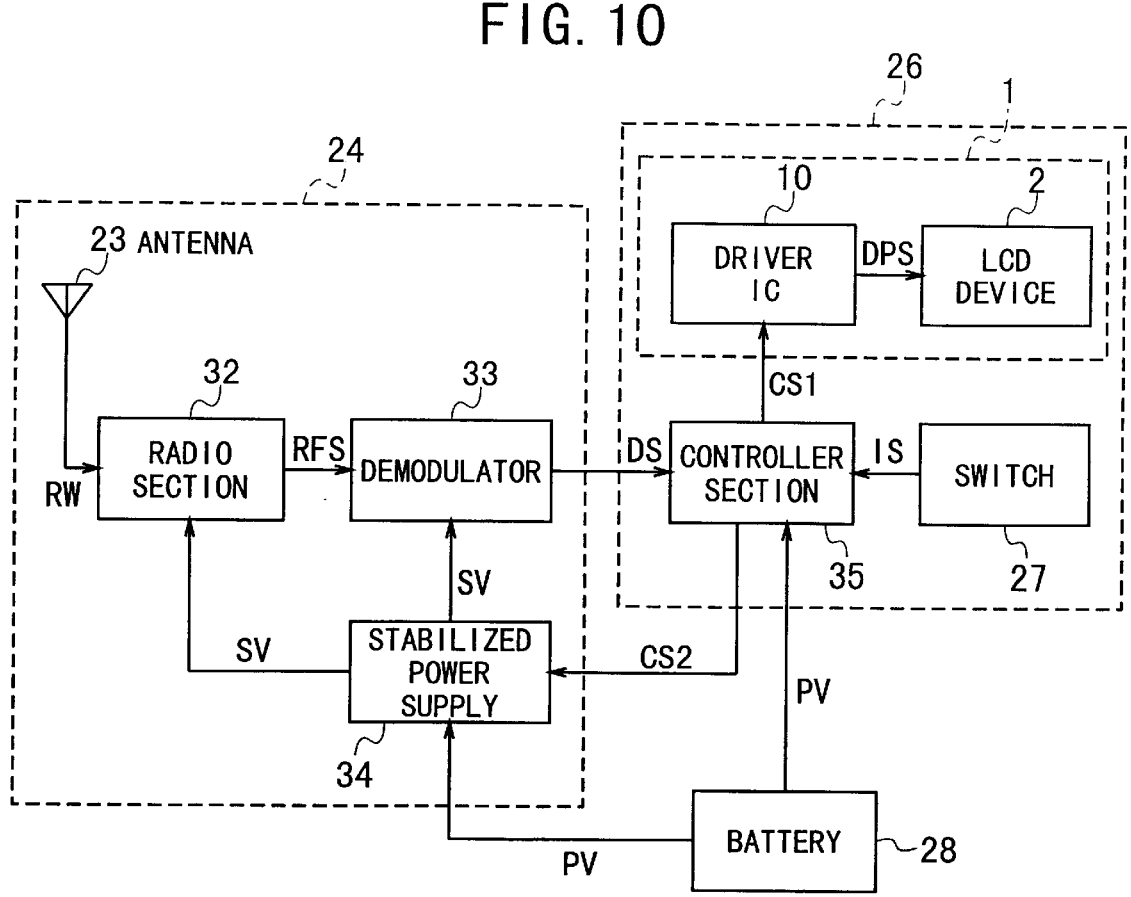
FIG. 10 is a functional block diagram showing the configuration of the pager including the LCD device retaining structure according to the first embodiment of FIG. 9.
Figure 11:
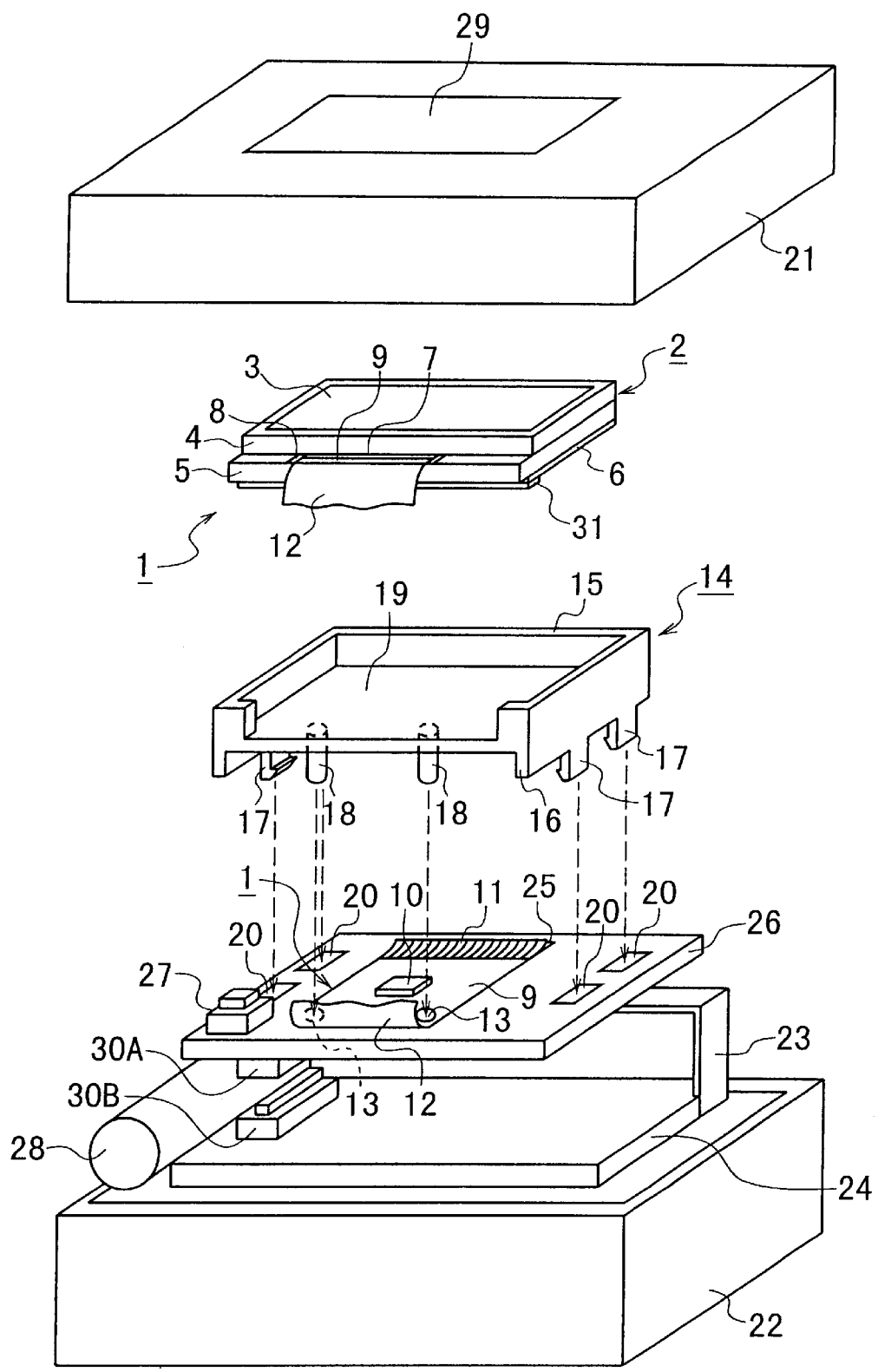
FIG. 11 is a perspective, exploded view of the pager including the LCD device retaining structure according to the first embodiment of FIG. 9.
Figure 12:
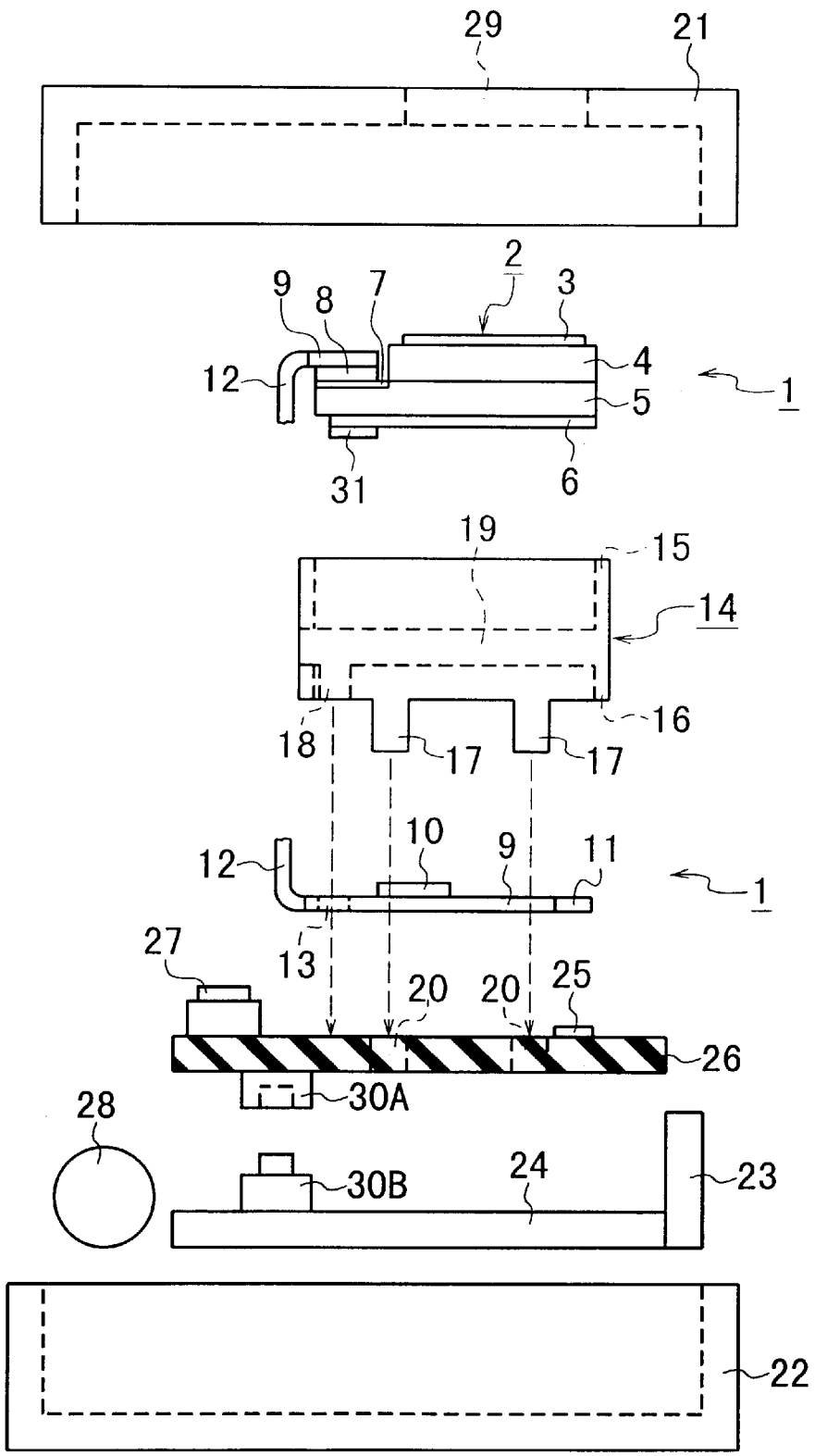
FIG. 12 is an exploded, right-side view of the pager including the LCD device retaining structure according to the first embodiment of FIG. 9.

FIGS. 10, 11, and 12 show the configuration of the pager incorporating the retaining structure of the LCD device according to the first embodiment.

As shown in FIG. 10, the pager is comprised of an antenna 23, a radio section 32, a demodulator 33, a stabilized power supply 34, a controller section 35, the driver IC 10, the LCD device 2, a set of switches 27, and a battery 28.

The antenna 23 detects selectively a desired radio wave RW from transmitted radio waves from a transmitting station. The radio section 32 receives the radio wave RW thus detected and converts the radio frequency of the wave RW to a suitable lower frequency, outputting a signal RFS. The demodulator 33 demodulates the signal RFS to extract the transmitted data signal DS therefrom. The controller section 35 receives the data signal DS thus extracted and applies necessary processing operations, thereby outputting a display signal CS1 to the driver IC 10. In response to the display signal CS1, the driver IC 10 outputs a display signal DPS to the LCD device 2 to drive the same, thereby displaying a specific image or information on the screen of the device 2.

The set of switches 27 output an instruction signal or signals IS to the controller section 35 according to the switching operation instructed by the operator or user. For example, the instruction signal IS instructs the controller section 35 to turn the pager itself on or off, or to display the received message on the screen of the LCD device 2.

The battery 28 supplies the specific electric power PV to the stabilized power supply 34 and the controller section 35. The stabilized power supply 34 receives a control signal CS2 sent from the controller section 35 and then, it provides a stabilized supply voltage SV to the radio section 32 and the demodulator 33.

The antenna 23, the radio section 32, the demodulator 33, and the stabilized power supply 34 are arranged on a PWB termed the "RF board" 24. The controller section 35, the driver IC 10, the LCD device 2, and the switches 27 are arranged on the AF board 26, as already explained with reference to FIG. 9.

As shown in FIGS. 11 and 12, the pager comprises a front case member 21, a rear case member 22, the antenna 23, the RFboard 24, the AF board 26, the set of switches 27, the battery 28, the LCD module 1, and the LCD frame member 14.

The front case member 21 forms a front half of the case of this pager, where the case has a shape of a rectangular parallelepiped. The member 21 serves to protect the LCD device 2 located inside the member 21 against the external stress or force. To enable the user to see the screen of the LCD device 2 through the member 21, the member 21 has s rectangular window 29 made of a transparent material.

The rear case member 22 forms a rear half of the case of this pager. The member 22 protects the assemblies of the RF board 24 and the AF board 26 located inside the member 22 against the external stress or force.

The RF board 24, on which the antenna 23 is mounted, has the circuits for the radio section 32, the demodulator 33, and the stabilized power supply 34. Further, the RF board 24 has a male connector 30B on its upper surface. The male connector 30B is mechanically and electrically connected to a female connector 30A fixed on the lower surface of the AF board 26. The battery 28 is located adjacent to the left side of the board 26.

The AF board 26 has the circuits for the controller section 35 and the set of switches 27 on its upper surface. Further, the board 26 has the four rectangular engaging holes 20 into which the four pins 17 of the frame member 14 are respectively inserted and engaged with the same, and lands 25 to which the external terminals 11 of the TCP 9 are mechanically and electrically connected. The board 26 is fixed to the board 24 to be parallel to each other with a specific spacing.

The LCD module 1, which includes the LCD device 2 and the TCP 9, and the frame member 14 are mounted on the AF board 26, as shown in FIG. 9. The lower part of the TCP 9 is placed on the upper surface of the AF board 26 while the terminals 11 are connected to the lands 25.

Next, the assembly sequence of the pager shown in FIGS. 11 and 12 is explained below.

First, the LCD module 1 having the configuration shown in FIG. 4 is prepared. Then, the external terminals 11 of the TCP 9 of the LCD module 1 are mechanically and electrically connected to the lands 25 of the AF board 26 by a soldering process. Thus, the lower end of the TCP 9 is connected to the AF board 26.

Instead of the soldering process, this connection of the terminals 11 and the lands 25 may be performed by thermally pressing a heat seal that has been thermally pressed to the TCP 9 to a specific area of the board 26, or by connecting the external terminals 11 to a Flexible Printed Circuit (FPC) connector mounted onto the board 26.

Following this step, the LCD frame member 14 and the LCD module 1 are mounted on the AF board 26 in the following way.

The four engaging pins 17 of the member 14 are positioned over the AF board to be overlapped with the corresponding holes 20 of the board 26 and then, the member 14 is pressed downward, thereby inserting the pins 14 into the individual holes 20. The pins 14 thus penetrated through the board 26 are engaged with the same, thereby fixing mechanically the member 14 onto the board 26.

At this stage, the lower end of the lower peripheral wall 16 of the frame member 14 is entirely contacted with the upper surface of the AF board 26. Also, at this time, the two cylindrical bosses 18 of the member 14 penetrate through the corresponding holes 13 of the TCP 9 and further, the bottom ends of the bosses 18 are contacted with the upper surface of the board 26. Thus, the bosses 18 effectively support the front edge of the member 14.

Subsequently, the upper part of the TCP 9 is bent upward at the bending or flexible part 12 so as to extend in parallel to the frame member 14. Then, the LCD device 2 is fitted into the upper space S1 of the frame member 14 and fixed to its upper surface 19e with the double-coated tape 31. Thus, the LCD module 1 is mounted on the AF board 26 using the frame member 14. The stage at this stage is clearly shown in FIG. 9.

Furthermore, the AF board 26 having the LCD module 1 and the frame member 14 is mechanically and electrically connected to the RF board 24 by using the connectors 30A and 30B. Then, these two boards 26 and 24 thus coupled together are inserted into the front case member 21 together with the battery 28. Finally, the rear case member 22 is fixed to the front case member 21 by screws (not shown) or the like, completing the assembly processes of the pager.

With the pager incorporating the retaining structure according to the first embodiment, as described above, when the LCD module 1 is mounted on the AF board 26 using the frame member 14, the cylindrical bosses 18 of the frame member 14 penetrate through the circular holes 13 of the TCP 9 to be contacted with the upper surface of the AF board 26. Therefore, although the front edge of the member 14 is not supported by the lower frame part 16 due to existence of the lower opening 16e, it is supported by the bosses 18. In other words, the mechanical strength of the member 14 near its front edge is effectively reinforced by simply providing the bosses 18.

Accordingly, any damage of the LCD device 2 such as cracks and any breakage and failure of the terminals 7 of the TCP 9 can be suppressed even if the pager is subjected to external shock or forces.

Also, because the mechanical stress is not applied to the LCD device 2, the possibility of vibration of the device 2 is substantially eliminated. As a result, the external terminals 11 of the TCP 9 can be prevented from damaged due to the unwanted vibration.

Second Embodiment

Figure 13:
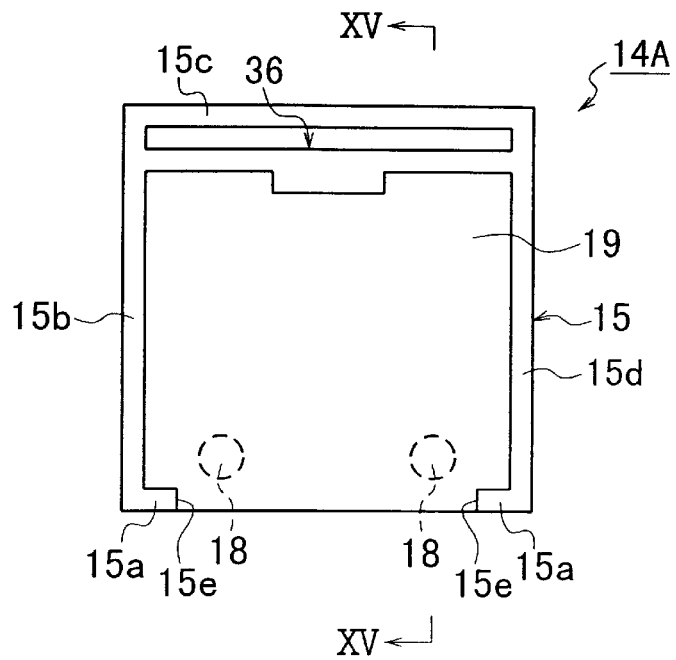
FIG. 13 is a plan view of a frame member used for a LCD device retaining structure according to a second embodiment of the invention.
Figure 14:
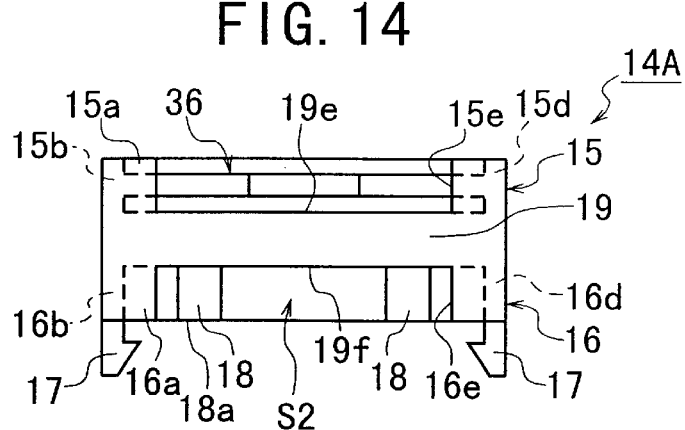
FIG. 14 is a front view of the frame member of FIG. 13.
Figure 15:
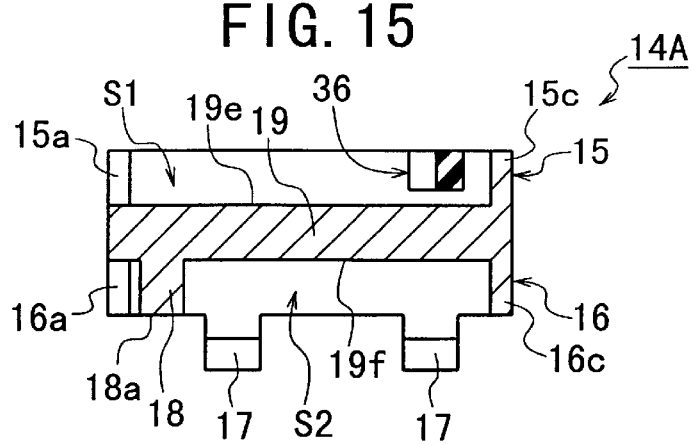
FIG. 15 is a cross-sectional view along the line XV—XV in FIG. 13.
Figure 16:
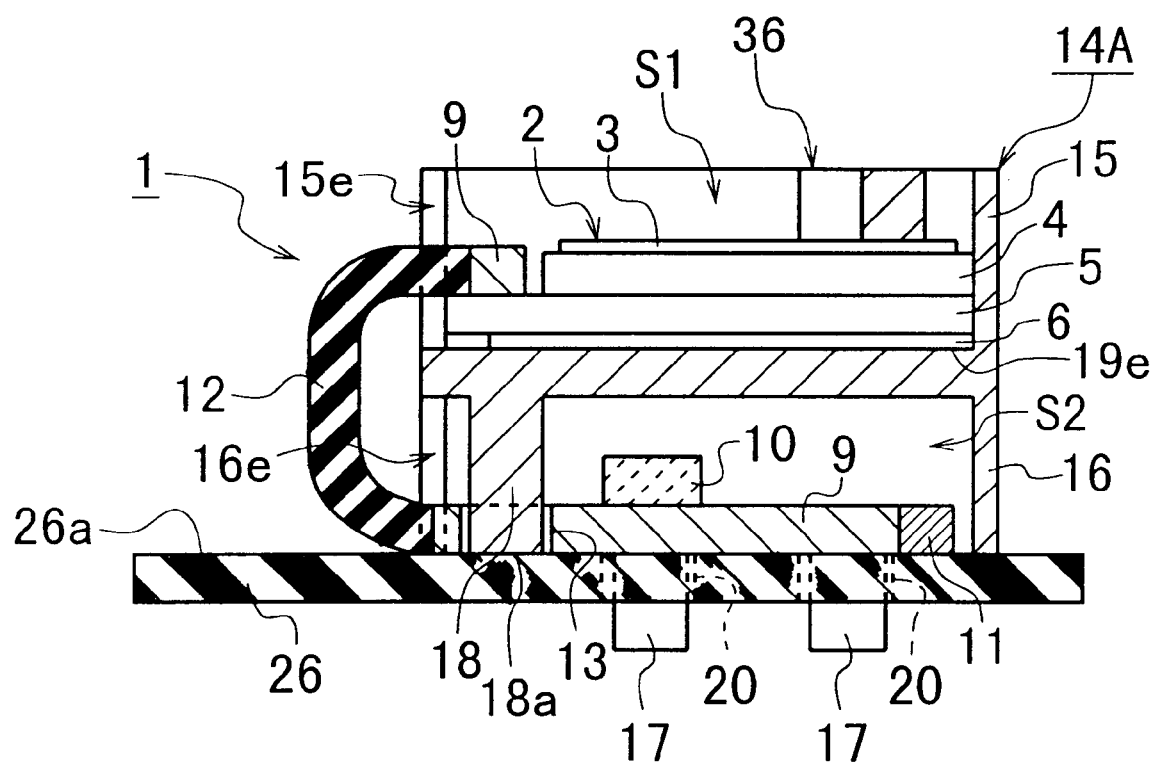
FIG. 16 is a partial, cross-sectional view of an LCD module mounted on the PWB using the frame member of FIGS. 13 to 15, which includes the LCD device retaining structure according to the second embodiment.

FIG. 16 shows the configuration of an LCD device retaining structure according to a second embodiment. FIGS. 13 to 15 show the configuration of a frame member 14A of a pager including the retaining. structure according to the second embodiment.

The frame member 14A has the same configuration as that of the frame member 14 used in the first embodiment, except that a plastic spring 36 is additionally formed. Therefore, the explanation about the same configuration is omitted here for simplification of description by attaching the same reference symbols as those used in the first embodiment in FIGS. 13 to 16.

The spring 36, which is rod-shaped, is located near the rear end of the rectangular main part 19 of the frame member 14A so as to link the left- and right-side walls 15b and 15d together. The spring 36 is parallel to the rear wall 15c.

When the LCD device 2 is located on the flat surface 19e to be fitted into the upper space S1, the device 2 is engaged with the spring 36, as clearly shown in FIG. 16. Thus, the upper surface of the device 2 can be pressed downward onto the surface 19e by the elasticity of the spring 36. As a result, there is an additional advantage that the device 2 is fixed in the space S1 without using the double-coated tape 31 used in the first embodiment.

It is needless to say that the pager including the frame member 14A according to the second embodiment has the same advantages as those in the first embodiment.

Third Embodiment

Figure 17:
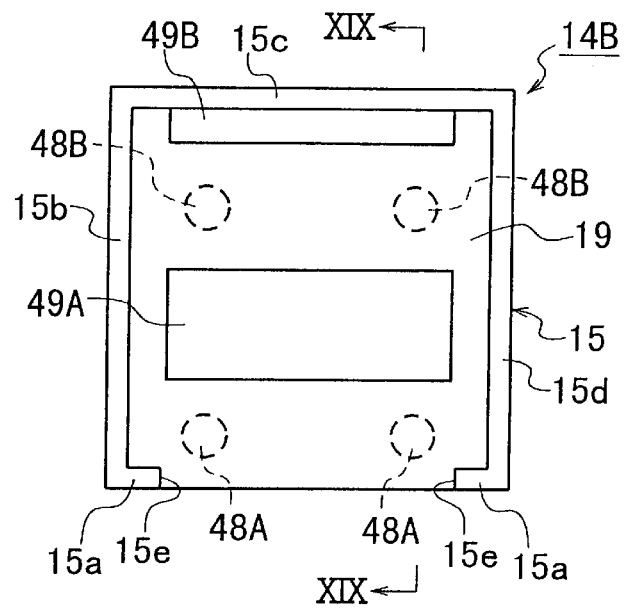
FIG. 17 is a plan view of a frame member used for a LCD device retaining structure according to a third embodiment of the invention.
Figure 18:
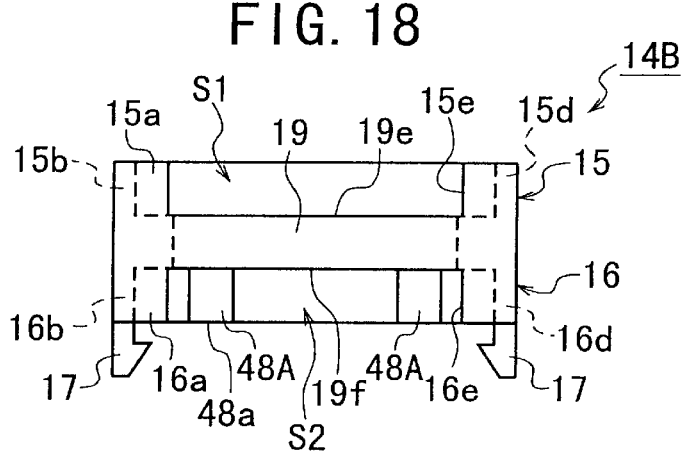
FIG. 18 is a front view of the frame member of FIG. 17.
Figure 19:
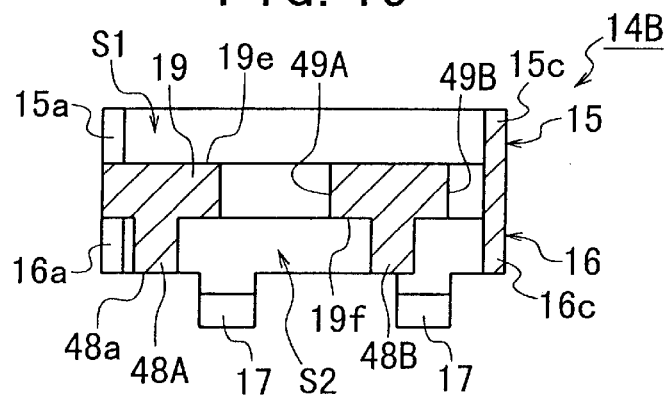
FIG. 19 is a cross-sectional view along the line XIX—XIX in FIG. 17.

FIGS. 17 to 19 show the configuration of a frame member 14B of a pager, which is used for an LCD device retaining structure according to a third embodiment.

In this embodiment, to make the frame member 14B more lightweight than the member 14 used in the first embodiment, two rectangular openings 49A and 49B are additionally formed in the main part 19. Four bosses 48A and 48B are formed to extend downward from the lower flat surface 19f of the part 19. The two bosses 48A are located between the front edge 19a of the part 19 and the larger opening 49A. The remaining two bosses 48B are located between the openings 49A and 49B.

Figure 20:
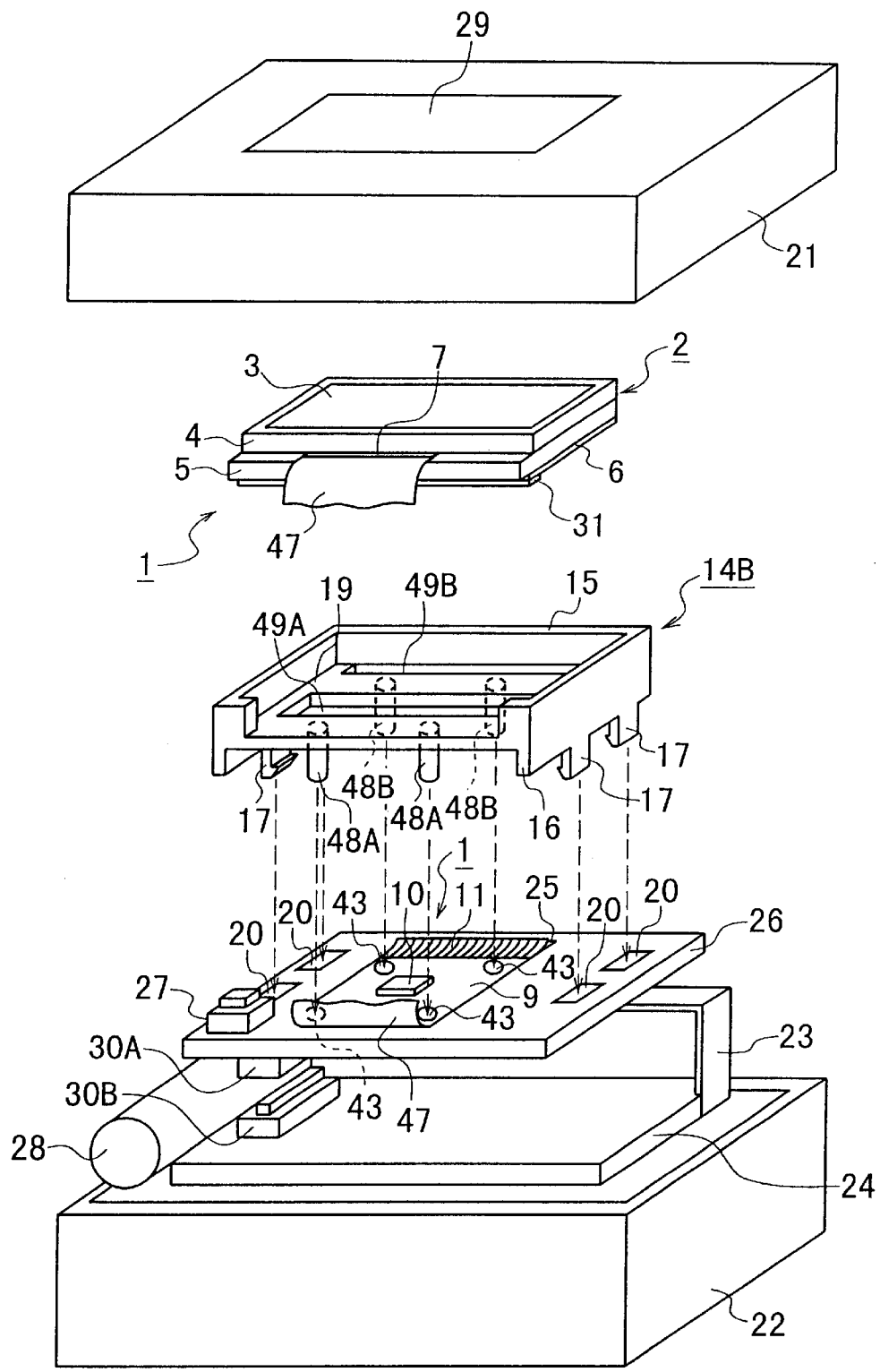
FIG. 20 is a perspective, exploded view of the pager including the LCD device retaining structure according to the third embodiment.
Figure 21:
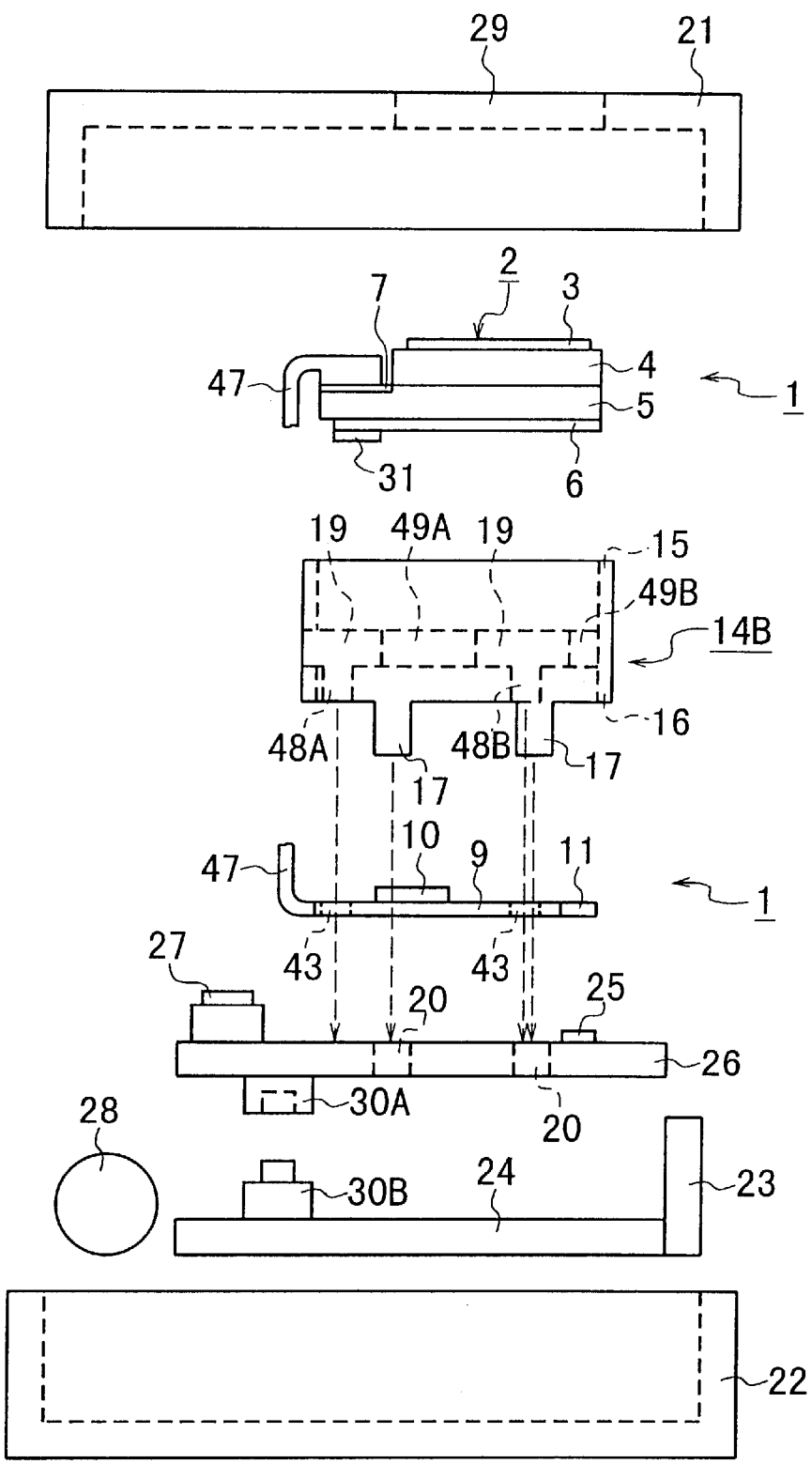
FIG. 21 is an exploded, right-side view of the pager including the LCD device retaining structure according to the third embodiment.

FIGS. 20 and 21 show the configuration of the pager incorporating the LCD device. retaining structure according to the third embodiment. Here, the bending part 47 of the TCP 9 has wiring cables coupled together by a so-called heat seal.

With the LCD device retaining structure according to the third embodiment, because the openings 49A and 49B are provided, the frame member 14B itself and therefore, the pager becomes more lightweight. Although mechanical strength lowering occurs in the member 14B due to the openings 49A and 49B, it can be compensated by the four bosses 48A and 48B that are contacted with the upper surface of the AF board 26.

It is needless to say that the pager including the frame member 14B according to the third embodiment has the same advantages as those in the first embodiment.

Fourth Embodiment

Figure 22:
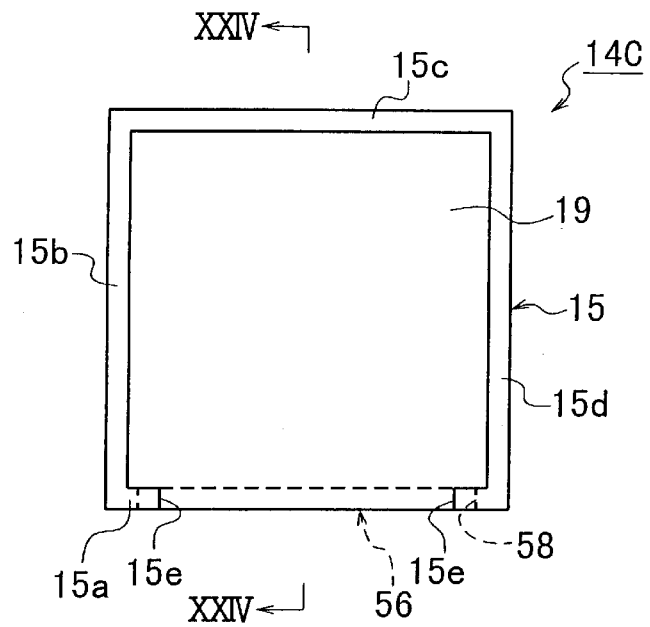
FIG. 22 is a plan view of a frame member used for a LCD device retaining structure according to a fourth embodiment of the invention.
Figure 23:
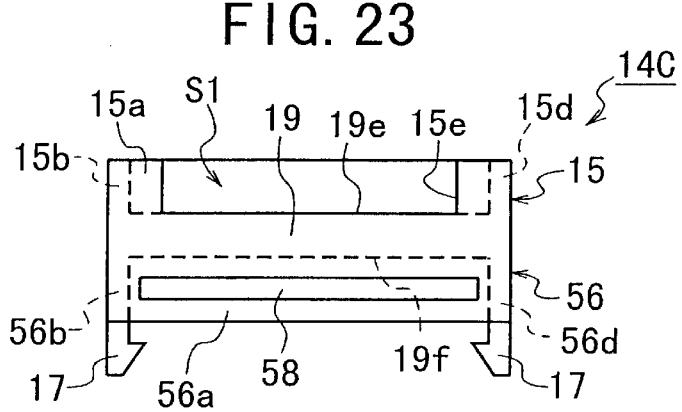
FIG. 23 is a front view of the frame member of FIG. 22.
Figure 24:
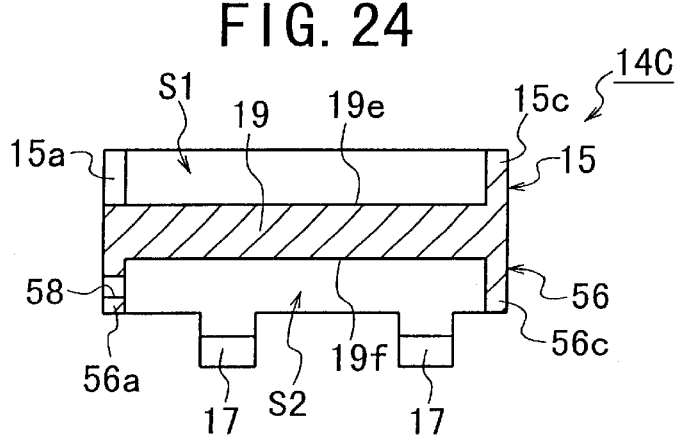
FIG. 24 is a cross-sectional view along the line XXIV—XXIV in FIG. 22.

FIGS. 22 to 24 show the configuration of a frame member 14C of a pager, which includes a retaining structure of an LCD device according to a fourth embodiment.

The frame member 14C has the same configuration as that of the frame member 14 used in the first embodiment, except that a lower frame part 56 has front, left, rear, and right walls 56a, 56b, 56c, and 56d located respectively on the four lower edges of the main part 19 and perpendicular to the same, and that a rectangular window 58 is formed to penetrate the front wall 56a. Each of the four walls 56a, 56b, 56c, and 56d cover entirely the corresponding edges of the main part 19, respectively. The opening 58 is formed to allow the TCP 9 to enter the lower space S2 through the front wall 56a.

With the LCD device retaining structure according to the fourth embodiment, since the lower frame part 56 of the frame member 14C has four walls 56a, 56b, 56c, and 56d that surround entirely the main part 19, the frame member 14C has a higher mechanical strength than that of the frame member 14 used in the first embodiment. As a result, even if the bosses 18 or 48 are omitted, the LCD frame member 14C can be effectively prevented from being deformed when some mechanical stress or shock is applied to the pager due to falling, bending, or twisting. This means that the mechanical stress is not applied to the LCD device 2.

Additionally, in the fourth embodiment, the four walls 56a, 56b, 56c, and 56d of the lower frame part 56 cover the whole edges of the main part 19, in other words, the frame part 56 is formed to extend along the whole periphery of the main part 19. However, to decrease the weight of the frame member 14C, at least one slit may be formed in any of the walls 56a, 56b, 56c, and 56d as necessary.

In the above-explained first to third embodiments, the number, position, and shape of the bosses 18 or 58 maybe optionally changed, if the mechanical strength of the frame member 14, 14A, or 14B can be increased.

In the above-explained first to fourth embodiments, the LCD device retaining structure of the invention is applied to a pager. However, needless to say, the invention may be applied to any other portable equipment if it has a LCD device. Moreover, the RF board 24 and the AF board 26 are used in the above-described first to fourth embodiments.

However, it is need less to say that the combination of these boards 24 and 26 may be replaced with a single PWB.

While the preferred forms of the present invention have been described, it is to be understood that modifications will be apparent to those skilled in the art. without:departing from the spirit of the invention. The scope of the present invention, therefore, is to be determined solely by the following claims.

What is claimed is:

1. A retaining structure of an LCD device for portable equipment, comprising:
 (a) an LCD device;
 (b) a first circuit board having a driver IC for driving said LCD device, a first set of terminals electrically connected to said driver IC, and a second set of terminals electrically connected to said driver IC;
  said first circuit board being flexible so as to be bent at a flexible position;
  said first set of terminals being located near one end of said first circuit board and mechanically and electrically connected to said LCD device;
  said second set of terminals being located near the other end of said first circuit board;
  said first circuit board having penetrating holes;
 (c) a second circuit board having specific circuits for said electronic equipment;
  said circuits of said second circuit board being mechanically and electrically connected to said second set of terminals of said first circuit board; and
 (d) a frame member having a lower frame part and bosses extending downward;
  said LCD device being fixed on an upper face of said frame member;
  said lower frame part being contacted with said second circuit board to form a space between said frame member and said second circuit board, thereby fixing said frame member to said second circuit board and covering said second set of terminals of said first circuit board in said space;
  said lower frame part having a window for allowing said first circuit board to enter said space through said lower frame part;
  said bosses being located near said window of said lower frame part and penetrating said holes of said first circuit board to be contacted with said second circuit board in said space.

2. The structure according to claim 1, wherein said frame member has an upper frame part formed to surround said LCD device, and said upper frame part has a window for allowing said first circuit board to penetrate said upper frame part;
 and wherein said windows of said upper and lower frame parts are located near one side of said frame member, said bosses being arranged along said side of said frame member.

3. The structure according to claim 1, wherein said frame member has an opening penetrating the same, said bosses of said frame member being arranged near said window of said lower frame part and said opening.

4. A retaining structure of an LCD device for portable equipment, comprising;
 (a) an LCD device;
 (b) a first circuit board having a driver IC for driving said LCD device, a first set of-.terminals electrically connected to said driver IC, and a second set of terminals electrically connected to said driver IC;

said first circuit board being flexible so as to be bent at a flexible position;

said first set of terminals being located near one end of said first circuit board and mechanically and electrically connected to said LCD device;

said second set of terminals being located near the other end of said first circuit board;

said first circuit board having penetrating holes;

(c) a second circuit board having specific circuits for said electronic equipment;

said circuits of said second circuit board being mechanically and electrically connected to said second set of terminals of said first circuit board; and (d) a frame member having a lower frame part surrounding said entire periphery of said member;

said LCD device being fixed on an upper face of said frame member;

said lower frame part being contacted with said second circuit board to form a closed space between said frame member and said second circuit board, thereby fixing said frame member to said second circuit board and covering said second set of terminals of said first circuit board in said space;

said lower frame part having a window for allowing said first circuit board to enter said space through said lower frame part;

said frame member being supported by said whole lower frame part.

5. The structure according to claim 4, wherein said frame has an upper frame part formed to surround said LCD device, and said upper frame part has a window for allowing said first circuit board to penetrate said upper frame part;

and wherein said windows of said upper and lower frame parts are located near one side of said frame member.

* * * * *